(12) United States Patent
Friis

(10) Patent No.: US 6,225,553 B1
(45) Date of Patent: May 1, 2001

(54) FLUID COOLED CABLE BEND RESTRICTOR

(75) Inventor: Brigt Løkke Friis, Økern (NO)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/233,123

(22) Filed: Jan. 19, 1999

(30) Foreign Application Priority Data

Jan. 19, 1998 (NO) .................................................. 19980231

(51) Int. Cl.$^7$ ...................................................... H01B 7/34
(52) U.S. Cl. ................ 174/10; 361/677; 174/8; 174/15.1; 174/15.6; 174/47
(58) Field of Search ................... 174/8, 10, 15.1, 174/15.6, 47, 23 R; 361/677

(56) References Cited

U.S. PATENT DOCUMENTS

| | | | |
|---|---|---|---|
| 4,199,653 | * 4/1980 | Talley | 174/15 WF |
| 5,004,865 | * 4/1991 | Krupnicki | 174/15.7 |
| 5,051,539 | * 9/1991 | Leathers-Wiessner | 174/15.7 |
| 5,229,543 | * 7/1993 | Strefling | 174/15.6 |
| 5,461,215 | * 10/1995 | Haldeman | 219/677 |

* cited by examiner

Primary Examiner—Dean A. Reichard
Assistant Examiner—W. David Walkenhorst
(74) Attorney, Agent, or Firm—Sughrue, Mion, Zinn, Macpeak & Seas, PLLC

(57) ABSTRACT

The present invention relates to an apparatus and method for increasing the power rating of an offshore high voltage power cable (1) which includes passage of the cable from the sea to a platform installation (2) through a bending strain reliever (BSR) (4). An inlet for introducing cooling fluid to an interface space (5) between the BSR and the cable is provided through a sleeve, (6) closing the space at the end (7) of the BSR and that an outlet for the fluid is provided at the upper end (12) of the BSR through a special flange (13).

6 Claims, 1 Drawing Sheet

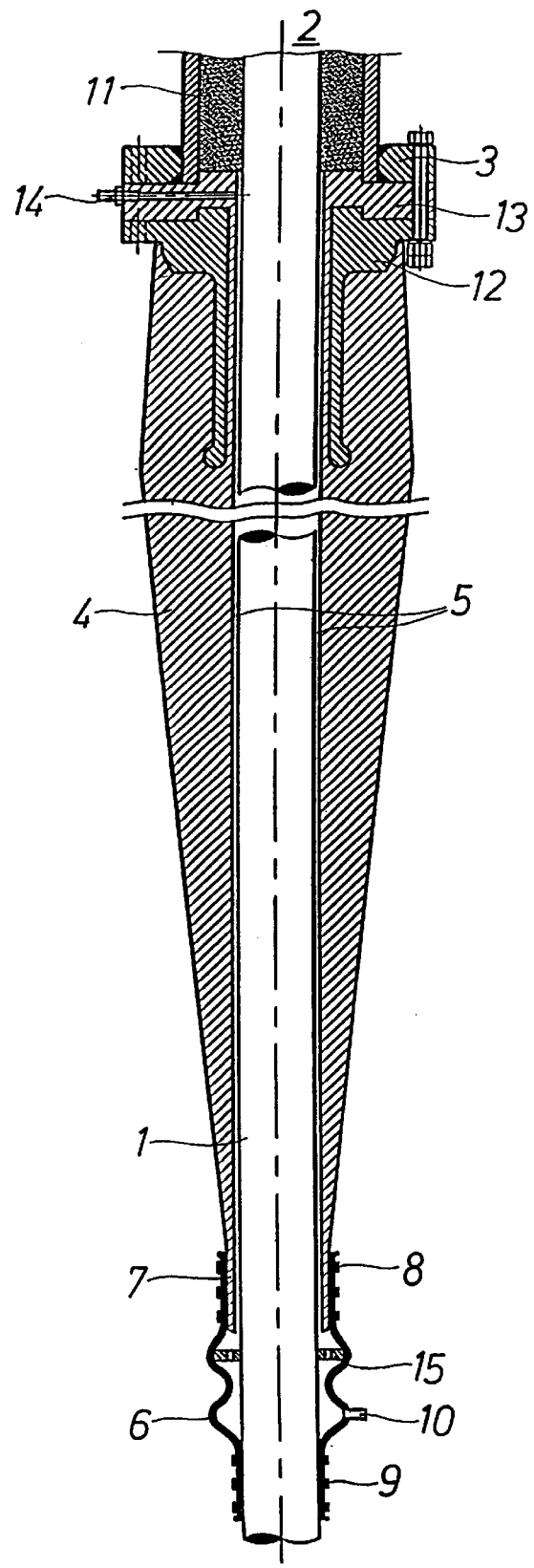
FIGURE

FLUID COOLED CABLE BEND RESTRICTOR

BACKGROUND OF THE INVENTION

The present invention relates to means and method for increasing the power rating of an offshore high voltage power cable which includes passage of the cable from the sea to a platform installation through a bending strain reliever (BSR). A technical problem is related to the fact that the power rating of the cable is lower through the BSR (some 30%) than through the water.

EP 777034 A1 (NO 965068) relates to a 'stiffening element for a flexible pipeline in a marine environment'. When the pipeline contains hot fluid the polyurethane BSR is damaged over time and this problem is overcome by passing cooling sea water through ducts made in the BSR. This construction could probably also be used for high voltage power cables, but requires a special BSR.

The object of the present invention is to increase the power rating of a high voltage power cable passing through the BSR without having to use a special BSR.

The main features of the invention are defined in the, accompanying claims. For installation purposes,—the inner diameter of the BSR will have to be slightly greater than the outer diameter of the cable, and the basic idea is to circulate cooling fluid (water) in the interface space between the cable and the BSR and provide suitable inlet and outlet for the fluid.

The solution which eliminates the power loss through the BSR has been proven to be workable by calculations based on a 5–10 mm diameter difference between the BSR and the cable with circulation of a cooling fluid at a rate of 5–10 l/min.

BRIEF DESCRIPTION OF THE DRAWINGS

Above mentioned and other features and objects of the present invention will clearly appear from the following, detailed description of embodiments of the invention taken in conjunction with the drawings, where the single FIGURE schematically illustrates a restrictor according to the invention.

DETAILED DESCRIPTION OF THE INVENTION

The FIGURE schematically illustrates a high voltage power cable 1 entering an offshore platform installation 2 having a hang-off head 3 through a bending strain reliever (BSR) 4 from the sea bed. The inner diameter of the BSR 4 is somewhat larger than the outer diameter of the cable 1 to provide an interface space 5 for circulation of a cooling fluid.

A split sleeve 6 such as a rubber sleeve—is arranged over the lower end 7 of the BSR 4 and clamped to the BSR as well as to the cable surface. Two clamp arrangements 8 and 9 are shown. The sleeve is provided with a fluid inlet 10. The sleeve 6 may also be provided with a fluid distributor 15 for making sure that the fluid cools the whole cable surface. The sleeve 6 may be made of neoprene, viton or nitril rubber.

Between the hang-off head 3 of the offshore installation having a sealing device 11 and the upper end 12 of the BSR there is inserted a split flange 13 having a fluid outlet 14.

The cooling fluid may be circulated against gravity from the lower tapered end 7 of the BSR to the flange end 12 of the BSR in a closed fluid loop (not shown) possibly including a fluid reservoir.

The above detailed description of embodiments of this invention must be taken as examples only and should not be considered as limitations on the scope of protection.

What is claimed is:

1. An apparatus for increasing a power rating of an offshore high voltage power cable which includes passage of the cable from the sea to a platform installation through a bending strain reliever (BSR), comprising:

an inlet for introducing cooling fluid to an interface space disposed concentric to the cable and between an inner surface of the BSR and an outer surface of the cable, through a sleeve closing a space at an end of the BSR; and an outlet for the fluid provided at an upper end of the BSR through a special flange.

2. The apparatus according to claim 2, wherein the sleeve is provided with a fluid distributor.

3. The apparatus according to claim 1, wherein the sleeve and the flange are of a splittable type which can be installed on the BSR from the outside.

4. The apparatus according to claim 1, the sleeve is made of one of neoprene, viton and nitril rubber.

5. A method for increasing a power rating of an offshore high voltage power cable which includes passage of the cable from the sea to a platform installation through a bending strain reliever (BSR) having an inner diameter which is slightly greater than an outer diameter of the cable, comprising the step of:

passing a cooling fluid through an interface space disposed concentric to the cable and between an inner surface of the BSR and an outer surface of the cable, from an inlet sleeve closing the space at an end of the BSR, to an outlet for the fluid which is provided at an upper end of the BSR through a special flange.

6. The method according to claim 5, further comprising the step of circulating the cooling fluid against gravity from a lower tapered end of the BSR to a flange end of the BSR in a closed fluid loop.

* * * * *